United States Patent

Snyder

[11] 4,174,022
[45] Nov. 13, 1979

[54] ORCHARD LIFTS

[76] Inventor: W. Henry Snyder, c/o Zion's Mtn. View Nursing Home, 2730 E. 33rd St., Salt Lake City, Utah 84109

[21] Appl. No.: 768,108

[22] Filed: Feb. 14, 1977

[51] Int. Cl.² ............ A01D 46/20; A01D 46/24
[52] U.S. Cl. .................................. 182/145; 182/150
[58] Field of Search ............ 182/145, 148, 142, 141, 182/2, 36, 37, 150; 187/9 R, 11; 56/328 R

[56] References Cited

U.S. PATENT DOCUMENTS

| 1,362,944 | 12/1920 | Kirby | 182/145 |
|---|---|---|---|
| 2,562,634 | 7/1951 | Nelson | 187/11 |
| 3,203,503 | 8/1965 | Smith | 182/2 |
| 3,255,845 | 6/1966 | Gardner | 182/37 |
| 3,452,528 | 7/1969 | Fairchild | 182/37 |

FOREIGN PATENT DOCUMENTS 1074649  7/1967  United Kingdom .................. 182/142

Primary Examiner—Reinaldo P. Machado

[57] ABSTRACT

An orchard lift apparatus including a bicycle-type seat upon which an orchard worker may sit, said seat mounted on an elongated pole passing upward through a sleeve and friction hemisphere, said hemisphere resting within a socketed bridge through which said sleeve passes downward, a cable, attached to said sleeve-hemisphere unit, extends downward, approximately parallel to said pole, and is wound or unwound by the worker, on a drum at the base of said pole, by means of foot pedals. Whereby, the worker may move upward or downward, and may change the attitude of the seat in any direction, two straight poles or tubes constitute the legs, angling inward in an upward direction, the above mentioned socketed bridge rigidly fastened to, and spanning across the tops of said pole legs. Two arms attached near the tops of said pole legs, extending forward for three or more feet, and coming together to provide support and fastening for a more or less vertical board, slat, or rod, which is positioned against any convenient branch or crotch in the tree to support the orchard lift at an appropriate angle.

1 Claim, 1 Drawing Figure

ORCHARD LIFTS

BACKGROUND OF THE INVENTION

1. Field of the Invention

The invention relates to a lift or ladder replacement for orchard work.

2. Description of the prior art

Throughout history, the work of picking, pruning, and thinning of orchard trees has been performed almost exclusively from ladders. While such progress has been made in agricultural mechanization, orchard work still requires a manual function in most cases. In an effort to increase productivity, a number of hydraulic, self propelled lifts have been marketed to increase mobility. These lifts have found only limited acceptance since their cost is generally not justified by the limited increase in productivity and, often, a rough, uneven terrain will preclude their use.

SUMMARY OF THE INVENTION

It is an objective of this invention to provide vertical mobility to an orchard worker at a cost which may be comparable to, or below that of the usual tripod ladder. The proposed apparatus will be safer, will greately ease the amount of physical labor involved, and will presumably facilitate and enhance worker output.

In essence, the unit incorporates a cable which is wound or unwound on a foot-pedal driven drum, by which a seated worker may move himself up or down in place of the usual ladder rungs. Additionally, the worker may change the horizontal attitude of the seat rapidly in any direction. The unit, particularly if made primarilly of aluminum, should be quite light and easy to carry and position around the tree. Additional, optional means are provided for locking the cable to prevent its unwinding if a worker plans to remain at a given elevation for some time, and for a rapid, brake-controlled descent to the ground.

DESCRIPTION OF THE PREFERRED EMBODIMENT

Figure 1:
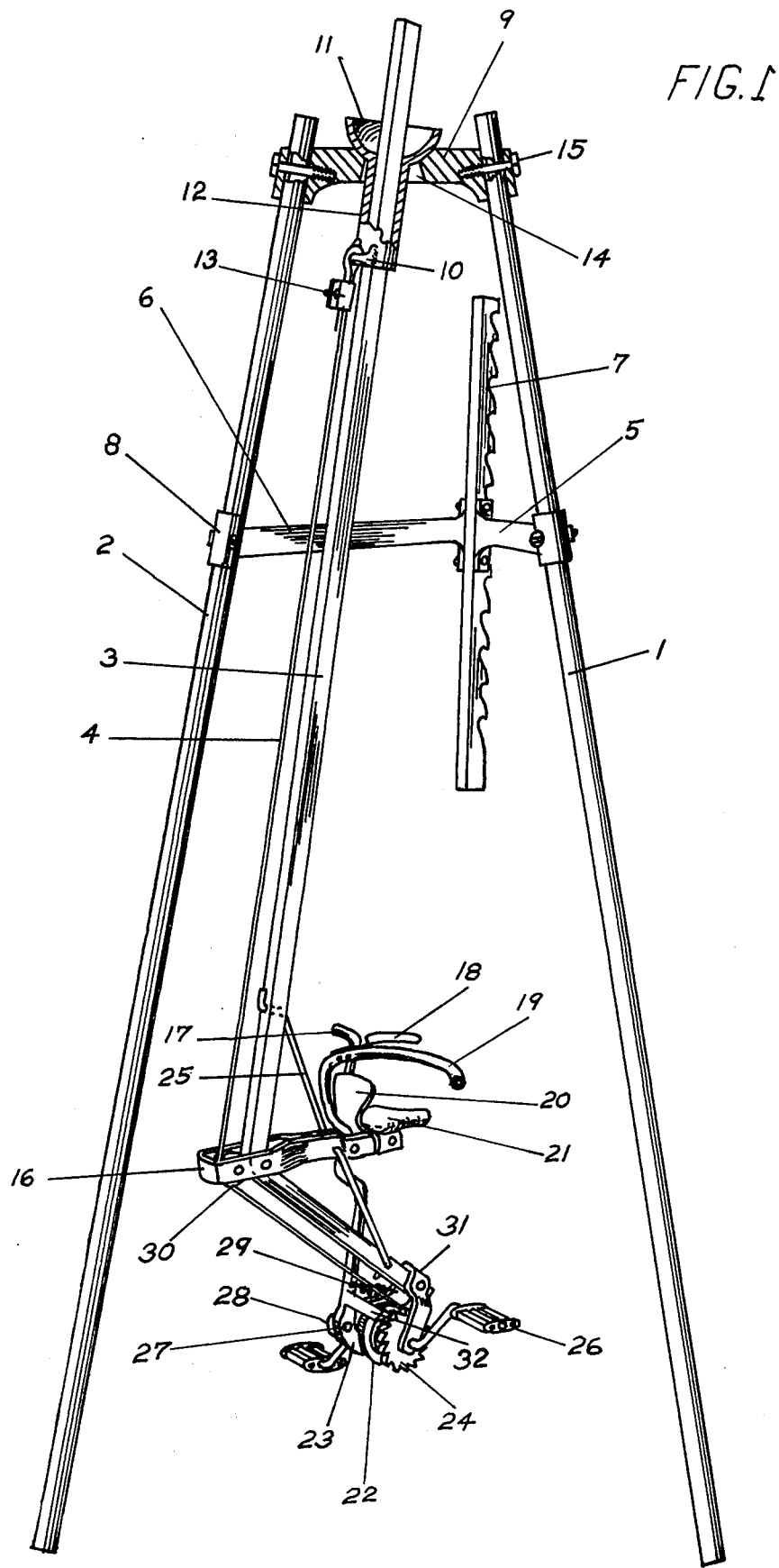
FIG. 1 is a perspective view of the entire apparatus, illustrating all the essential components, while the topmost socketed bridge, hemisphere, and sleeve are shown in section.

As shown in FIG. 1, elements 1 and 2 are the legs of the lift. Arms 5 and 6 are fastened to, and extend forward at approximately right angles to said legs 1 and 2 for a distance of, perhaps 4 feet. Vertical board 7 is fastened to the ends of said arms 5 and 6. The lift is positioned by resting vertical board 7 against any appropriate branch or crotch in the tree. Said board 7 could have notches, as shown, but this is not essential. The angle at which legs 1 and 2 are positioned via supporting vertical board 7 can be small without causing instability, so as t to exert minimal force against supporting branches of the tree.

Pendulum pole 3 has a rectangular cross section, and pass upward through sleeve 12 of hemisphere 11. Hemisphere 11 rests within socketed bridge 9. Friction between hemisphere 11 and socketed bridge 9 should be sufficiently low to permit rapid, easy turning of the entire seating apparatus, appended to pendulum pole 3, by the worker, who may push or pull on a convenient branch or legs 1 or 2. Calculations will show that steel on steel friction, involving a coefficient of static friction of 0.15, acting on, perhaps a 2 inch radius, will require, perhaps a 3 to 6 lb. turning force on the part of the seated worker.

Cable 4 is fastened to loop 10, which juts out from sleeve 12. Cable 4 passes downward, approximately parallel to pendulum pole 3, and passes over pulley 30 onto a wind-up drum whose sides are represented by elements 22 and 24. The orchard worker sits on seat 21, which is mounted on support 16. Brace 25 is a rigid metal rod which passes through pendulum pole 3, and support 16, as shown, and is physically bent at each of the three junctures shown, to provide fastening.

When the worker applies forward foot pressure to pedals 26, cable 4 will be wound up on the drum between sies 22-24, raising the entire seating apparatus, and moving pendulum pole 3 upward through sleeve 12. Cable 4 can be fastened to the drum simply by passing it through holes in the drum and tieing a knot on the far side. Safety bar 19 passes around the front of seat 21 at approximately the waist level of the worker, and is open on one side to permit the worker to mount and dismount the seat from behind it.

Elements 17,18, 22,23,24,27,28 and 29 are all non-essential, and are included in the drawing only as a convenience to the worker. They could be omitted by the manufacturer as an economy measure. Element 17 is a combination brake and lock lever which pivots on pin 27. Pin 27 is fastened to extension 28, which is a projection from pedal and drum support 31 and 18 is a spring which, when pulled inward toward safety bar 19, releases lever 17. Spring 29 will then pull lever 17 forward so that projection 32 will engage ratchet teeth around the circumference of drum siding 24, locking the drum so it cannot unwind. In this position, the cable can still be wound on the drum, raising the seat apparatus, while projection 32 slides over teeth on side 24, and there is no danger of unwinding, should the worker's feet slip off the pedals. This also permits the worker to reduce the force on the pedals to prevent unwinding.

When the lever 17 is pulled backward, it deflects spring 18 and end 23 of lever 17 applies a braking force on drum siding 22, using pin 27 as a fulcrum. This function can be used for a rapid descent by removing the feet from the pedals, allowing cable 4 to unwind at a controlled speed.

Spring 18 is fastened, as shown, to safety bar 19. The bend shown in spring 18 is provided to catch lever 17 in a neutral position where it niether locks nor brakes. This would be the desired position if the worker is picking, pruning, or thinning while descending.

DESIGN CONSIDERATIONS

1. The full unwound extension of the cable should cause the pedals to remain 3 to 6 inches above the ground with the apparatus in its normal working attitude.

2. The design should permit rapid, unobstructed mounting and dismounting.

3. Lever 17, spring 18, and safety bar 19 should all be below elbow level to minimize the danger of contact from arm movement.

4. Arms 5 and 6 should be wide enough apart to permit unobstructed passage of the worker between them.

5. Seat 21 shold be soft, well padded, and non-abrasive to prevent chaffing and discomfort despite a full day of movement and weight shifting.

6. Cable-winding drum should be of small enough diameter to permit relatively effortless winding of the cable. The size of the drum will, to some extent, determine the advisability of including lock-brake lever 17. If excessive leg force is required to prevent cable 4 from unwinding, due to a large drum, the cable lock would be advisable.

7. The pedals should be further forward and wider apart than bicycle pedals since the worker must use them for stability while working with both hands.

8. The opening in bridge 9, through which sleeve 12 passes, should prevent over-tilting of the seat which would occur through pendulum action as the seat moves upward toward the top.

9. For stacking, the seat can be turned sideways and pendulum pole 3 moved to one side of ams 5 and 6 of the unit upon which it is stacked.

ADVANTAGES

1. The picker will have both hands free to pick at all times without fear of falling.

2. The picker will have more mobility, can turn rapidly in all directions with no obstructions.

3. If the unit is made of aluminum, it will be lighter than a large tripod ladder of wood.

4. It will be easier to penetrate into a tree by eliminating ladder rungs.

5. The picker can descend rapidly and effortlessly by removing his feet from the pedals and using the handbrake.

6. The unit should cost no more, and possibly less than a tripod ladder.

7. It should be more stable, safer, and easier to position.

8. Much of the effort will be eliminated by sustaining most of the weight on the seat.

9. The picker will probably enjoy using this unit much more than a ladder.

10. If the unit should ever start to tip over, the worker would simply release the pedals, pull back on the handbrake, and coast to the ground.

What is claimed is:

1. An orchard lift apparatus, including a bicycle-type seat upon which an orchard worker may sit, said seat mounted on an elongated pole passing upward through a sleeve and friction hemisphere or partial hemisphere, said hemisphere resting within a socketed bridge through which said sleeve passes downward, a cable attached to said sleeve-hemisphere unit, extending downward, and wound or unwound by the worker on a drum, at the bottom of said elongated pole, by means of foot pedals whereby the worker may move upward or downward, two straight poles or tubes constituting the legs, angling inward in an upward direction, the above mentioned socketed bridge rigidly fastened to, and spanning across the tops of said pole legs, support means, attached to the upper portion of said apparatus, for holding the apparatus upright.

* * * * *